United States Patent [19]
Perl

[11] 3,888,587
[45] June 10, 1975

[54] LIGHT-PROOFED RADIOGRAPHIC CASSETTE UNLOADER AND RELOADER

[76] Inventor: Theodore Perl, 58 Ely Dr., Fayetteville, N.Y. 13066

[22] Filed: July 11, 1974

[21] Appl. No.: 487,575

[52] U.S. Cl. ............... 355/112; 214/301; 250/468
[51] Int. Cl. ..................... G03g 27/14; H05g 1/60
[58] Field of Search ............ 355/112, 133; 250/468, 250/480, 481; 214/301, 307

[56] References Cited
UNITED STATES PATENTS

| | | | |
|---|---|---|---|
| 3,150,263 | 9/1964 | Catlin | 250/468 |
| 3,374,351 | 3/1968 | Sano et al. | 250/468 |
| 3,634,687 | 1/1972 | Somerset et al. | 250/468 |
| 3,675,014 | 7/1972 | Perl | 250/468 |

Primary Examiner—Richard L. Moses
Attorney, Agent, or Firm—Bruns & Jenney

[57] ABSTRACT

For transfer of the exposed film in a cassette to a processor and transfer of fresh film to the cassette, a lightproof, wheeled cabinet has a magazine rotatably secured therein. The magazine has a plurality of compartments for receiving different sized cassettes, each compartment having an open, cassette-receiving end and a partially-open, film-release end. The cabinet has means for turning the magazine 90° from a first position in which the compartment floors are inclined 45° from the vertical in one direction to a second position in which the floors are inclined 45° from the vertical in the other direction. The cabinet has four stations: a cassette insertion station with a normally light-proofed door aligned with each compartment for insertion of the cassette at the upper end of the magazine when it is in its first position, a film unloading station with a film guide passage aligned with each compartment for receiving film from the magazine lower end when it is in its first position, a film reloading station with a film guide passage aligned with the partially open upper end of each compartment for furnishing film to the magazine when it is in its second position, and a cassette ejection station for releasing the cassettes from the lower open end of each compartment when the magazine is in its second position. An exposure is also provided for marking the film after it is released at the film unloading station.

4 Claims, 30 Drawing Figures

PATENTED JUN 10 1975     SHEET    1     3,888,587

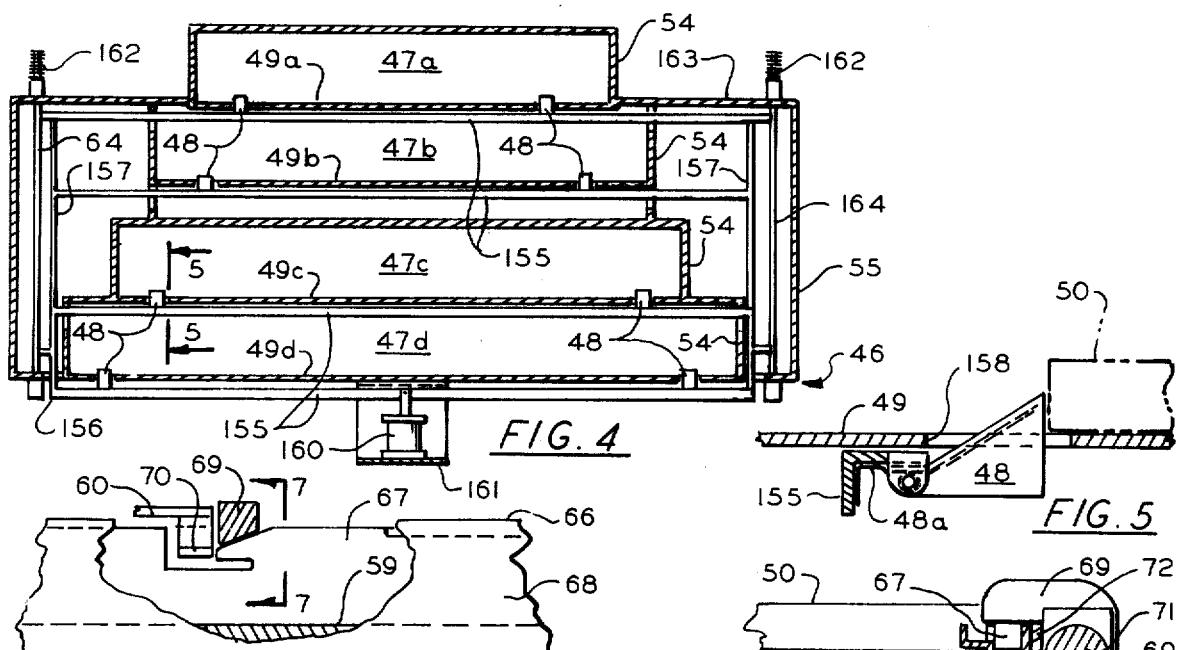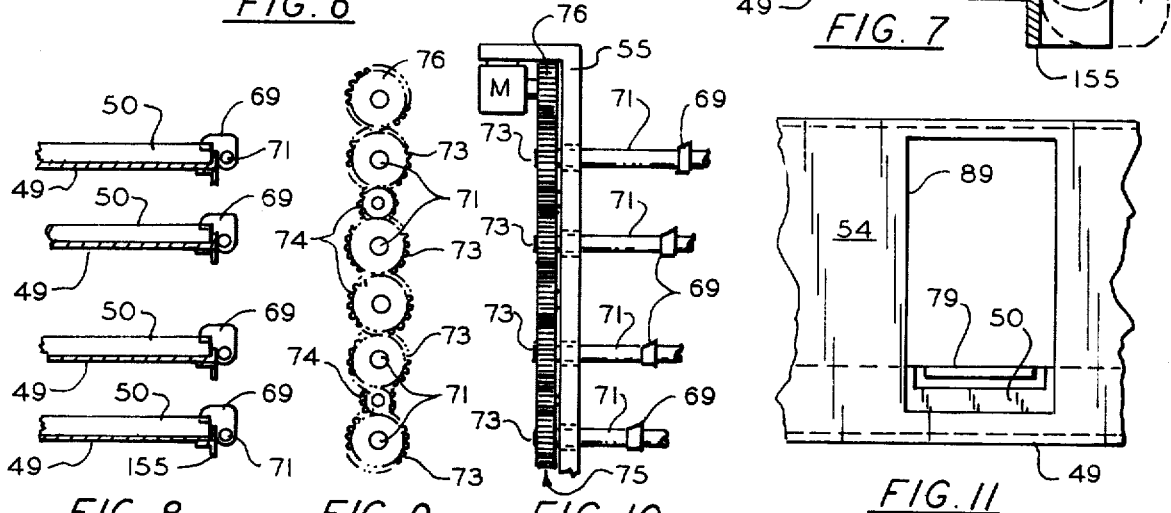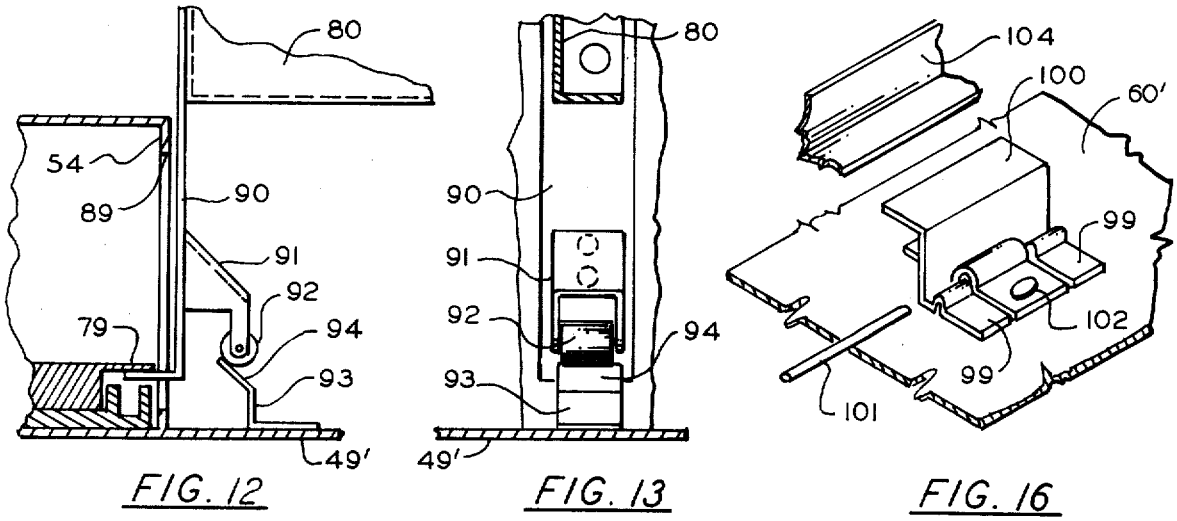

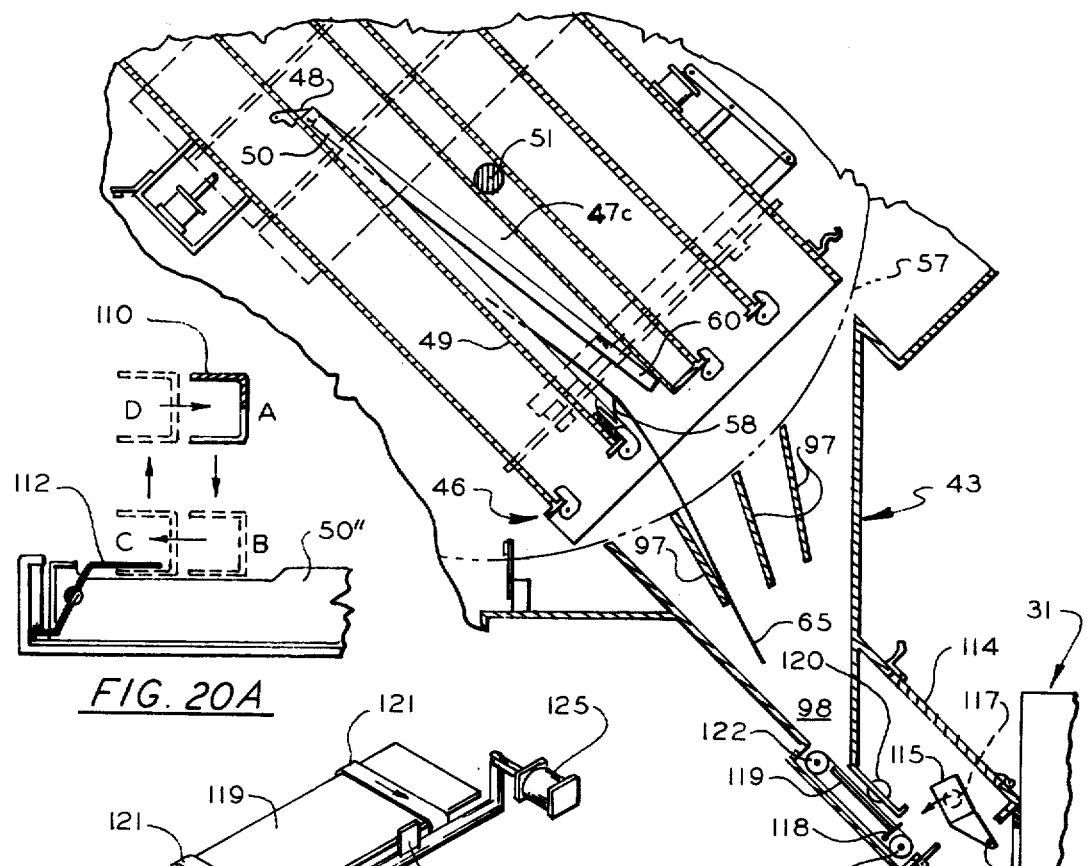
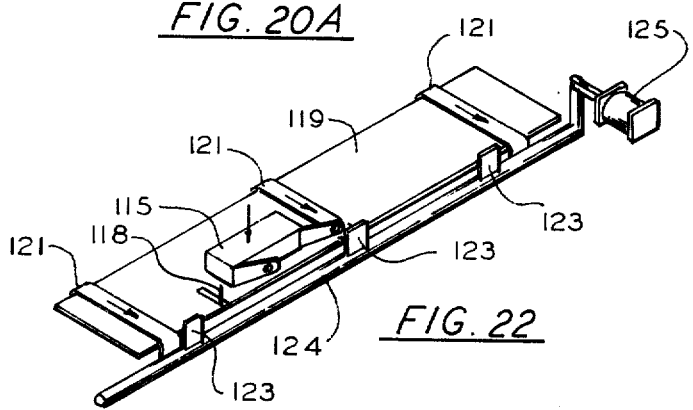
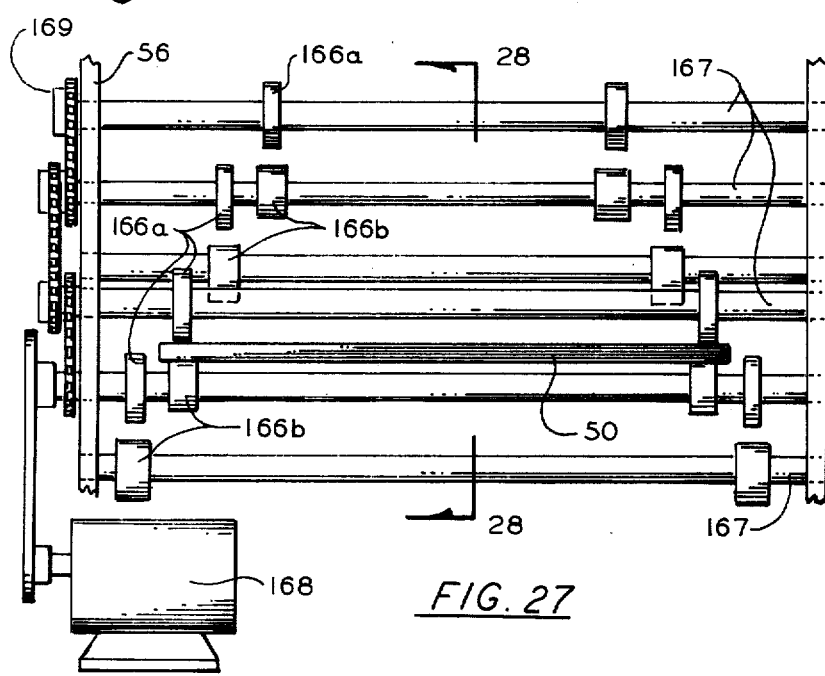

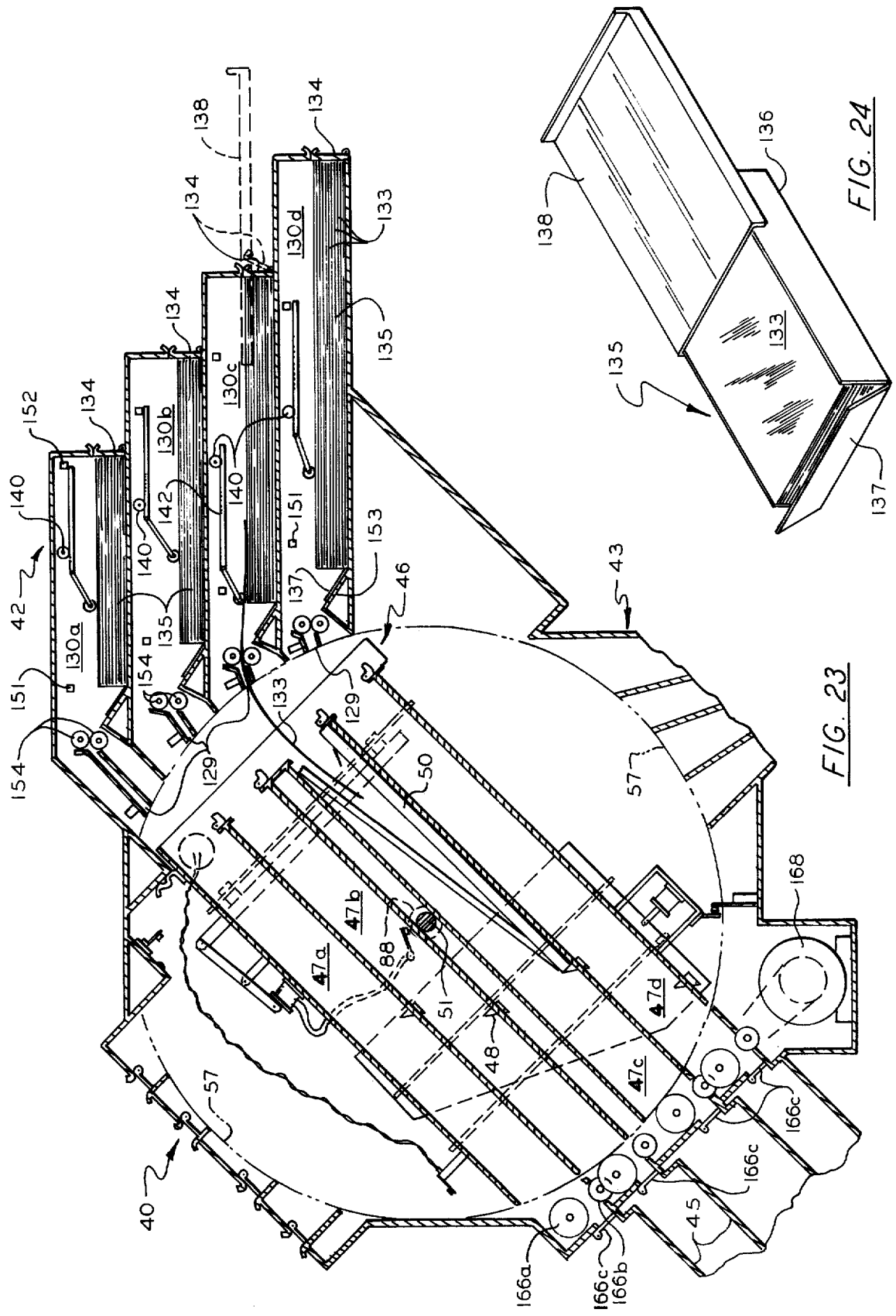

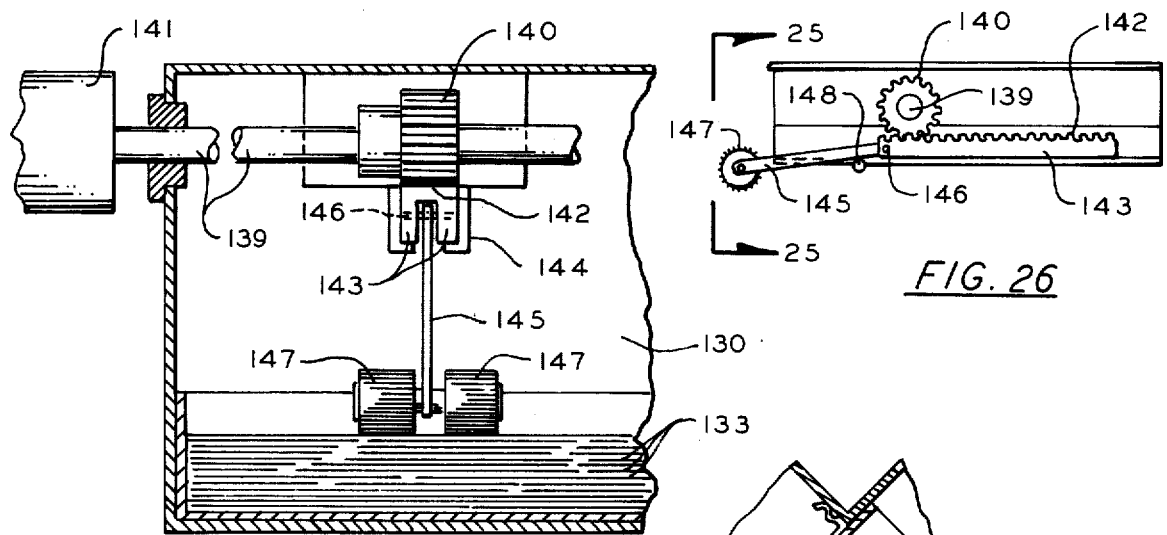
FIG. 25
FIG. 26
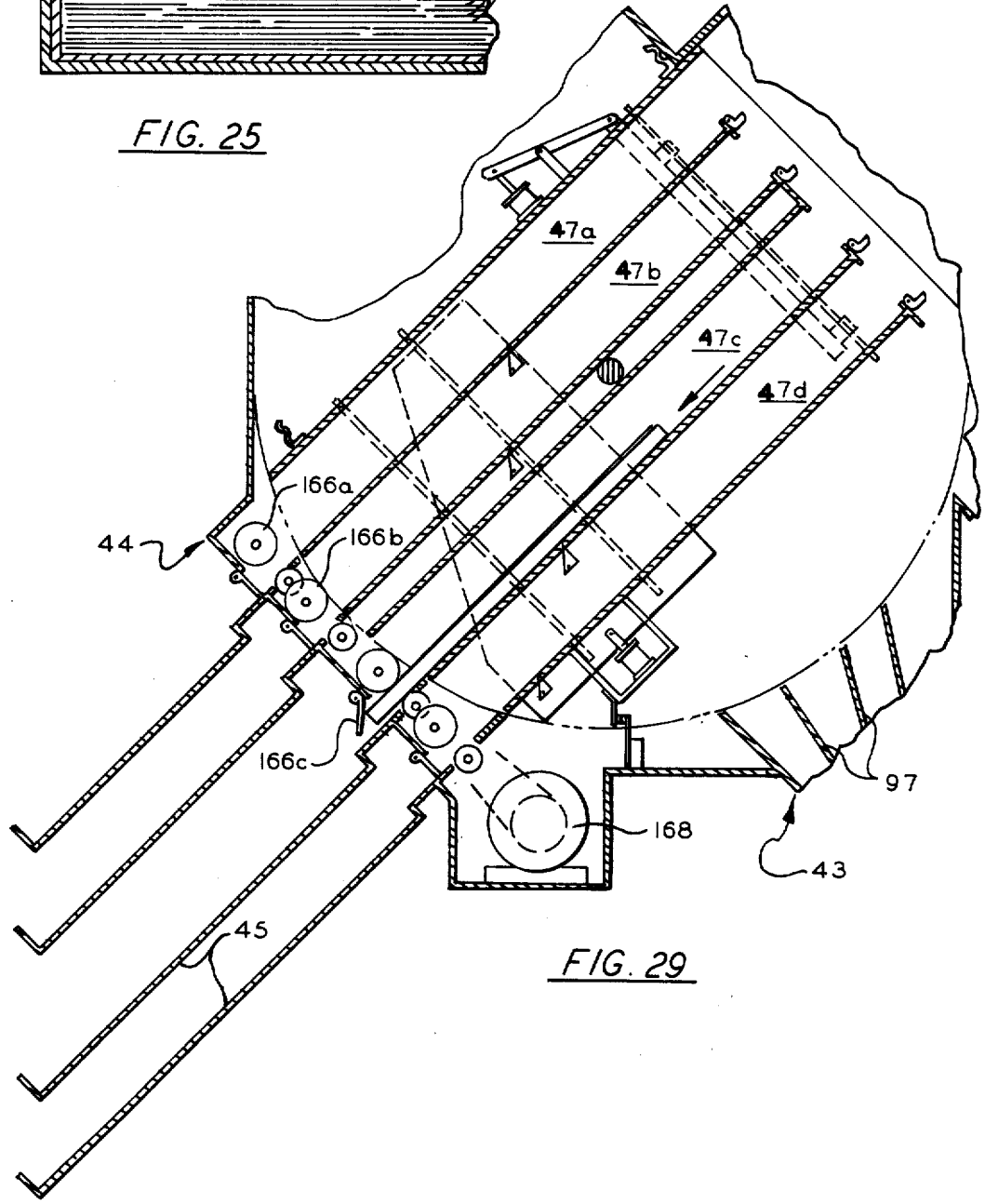
FIG. 29

LIGHT-PROOFED RADIOGRAPHIC CASSETTE UNLOADER AND RELOADER

BACKGROUND OF THE INVENTION

This invention relates to a single light-proof cabinet device, adapted to be joined to a conventional, automatic film processor, housing a rotatable magazine with a plurality of cassette unloading compartments for different cassette sizes, transporting the unloaded film to the processor, reloading the cassete with fresh film stored in the housing, and closing and locking the reloaded cassette, the cassettes being of the hinged type modified by addition of a simple spring-like part at the opening side or end.

After a radiographic film has been exposed, an operator must take the exposed film in its cassette to a darkroom and there manually unload the cassette, pass the film to the processor, reload the cassette with fresh film, and close and lock the cassette again. Cabinet unloader-reloaders have been developed but they are excessively expensive and usually are designed to take only one size of cassette or involve the use of redesigned cassettes.

SUMMARY OF THE INVENTION

The present invention contemplates a single light-proofed cabinet which may be used in the diagnostic room together with a known automatic film processor to which it is operatively coupled. The cabinet has a plurality of stations one for insertion of the cassette and provided with lightproofed doors, each for a different size of cassette. Another station is for storage of stacks of fresh film, each stack for a different size of film. Another station if for receiving the unloaded film, marking it with desired data if such marking is desired, and releasing and passing on to the processor the undeveloped film. The last station is for receiving the reloaded cassette, closing and locking the cassette and ejecting it into a tray for the particular size of cassette being processed.

Inside the cabinet a compartmented magazine is rotatably mounted so as to be moved from a first position, in which the compartments are inclined 45° in one direction from the vertical, to a second position inclined 45° in the other direction from the vertical. Each compartment is of a different size for different cassette sizes and each compartment is of sufficient length, usually greater than its width, to contain the cassette at one end when the magazine is in the first position and at its other end when the magazine is in its second position. A spring-biased latch in each compartment prevents the cassette from moving until desired when the magazine is first moved to its second position.

When the magazine is in the first position each compartment has an open end aligned with a cooperating door at the cassette insertion station and this end is at the upper end of the magazine. When a cassette is inserted, hinged side up, it slides down the compartment floor, depressing the latch which snaps up behind the cassette when it passes. The lower end of each compartment in the magazine first position is partially closed by a stop or stops to keep the cassette from sliding out of the magazine.

The magazine is provided with means for unlocking the cassette and for lifting the cassette lid. In the unautomated unloader-reloader described and claimed herein only one cassette at a time may be unloaded and reloaded so a single switch is provided at the cassette insertion station for initiation of the unlocking and lid raising mechanism.

Unlocking and lid lifting means for each of the wafer type cassette, the clamp type cassette, and the "Xomatic" (trademark) type of cassette are shown and described but not specifically claimed herein.

Each cassette is modified by the addition at the opening side or end of a strip of springy material, such as a resinous plastic material, the strip being bent along its midline so as to be V-shaped in cross section. One leg of the V is secured, as by adhesive, to the compressible pad in the base of the cassette and under the screen which lies on the pad. When fresh film is placed in the cassette the other leg of the V, the flap, elevates one edge of the film until the cassette is closed.

When the magazine is in its first position, the cassette slides by gravity to the stops at the partially open end of its compartment. When the cassete is unlocked and the lid is raised, the edge of the film to be processed is raised by the spring flap above the edge of the cassette base and is free to slide out of the cassette by gravity.

The lower, partially-open end of the magazine compartment is in register with the unloaded film receiving station of the cabinet when the magazine is in its first position. Funnel-shaped guides at this station receive the falling film sheet and guide it to a belt conveyor having releasable stops at its end. While held by the stops a pivotally mounted marking box, which has previously been loaded with a card bearing the desired data, is dropped onto the film by a trigger operated by the leading edge of the film and a light in the box is briefly flashed thus marking the film.

A push button switch on the cabinet at the film-receiving station is pressed by the operator when he is assured by inspection that the processor is ready to receive the film. This releases the stops at the end of the conveyor and the film is free to slide into the processor assisted by the conveyor.

Means for turning the magazine from its first to its second positions are provided in the form of a crank at the side of the cabinet which the operator swings counter-clockwise when he observes that the unloaded film has been received in the processor. The formerly lower, partially open ends of the magazine compartments are thus turned into registry with exit chutes or passages from the stacks of fresh film at the resupply station and the partially open ends become the upper ends of the compartments when the magazine is in its second position. The open cassete is held at the now upper end of its compartment by the latch means.

Each stack of resupply film is in its own chamber at the resupply station and each chamber has means for sliding the top sheet of film toward its resupply chute. A continuously rotating pair of rollers at the head of the resupply passage receive the advanced sheet and slide it through the chute into the open side of the cassette. A push buttom switch is provided to initiate the means for sliding the top film sheet at the resupply station, one switch for each resupply chamber, so only one sheet of the proper size is offered for reloading as chosen by the operator. The reloading is completed as the sheet of fresh film slides by gravity into the open cassette.

When the magazine is in its second position, the compartments now lower open ends are in register with cassette ejection doors at the cassette receiving station. A pair of rollers adjacent each door are spaced apart the thickness of a cassette and one roller of each pair is motor driven. When the operator operates a push button switch at the cassette ejection station, means are operated in the magazine for releasing all the latches so that the reloaded cassette is released and slides by gravity in its compartment through the open end of the compartment and to the pair of rollers which receive the cassette therebetween and close it and thereafter force it through the exit door into the tray at this station, completing the cycle.

Commutator means are provided for bringing electrical power to the devices in the magazine and stop latch means are provided in the cabinet for the magazine in both its first and second positions for registration of the magazine with the various stations.

BRIEF DESCRIPTION OF THE DRAWINGS

FIG. 4 is a sectional view on the line 4—4 of FIG. 2;

FIG. 5 is an enlarged fragmentary sectional view on the line 5—5 of FIG. 4;

FIG. 6 is an enlarged fragmentary view of a cassette sidewall as viewed in the direction of arrows 6—6 of FIG. 3 and an unlocker shown in section, portions being cut away for clarity;

FIG. 7 is a fragmentary sectional view on the line 7—7 of FIG. 6 showing a cassette in end elevation and the unlocker of FIG. 6 and associated parts, the unlocker being shown in operated position in full lines and in normal position in broken lines;

FIG. 8 is a fragmentary side elevational view on a reduced scale of the film-released end of the magazine, the compatment floors being shown in section;

FIG. 9 is a side elevational view of the gear train at the opposite side of the magazine from that shown in FIG. 8;

FIG. 10 is a fragmentary end elevational view of the magazine end;

FIG. 11 is an enlarged fragmentary view of a portion of a compartment sidewall and showing a cassette and its lifter tab;

FIG. 12 is a fragmentary front elevational view of a portion of the lifter frame shown in FIG. 14, portions of a compartment, and the magazine therein being diagrammatically shown in section;

FIG. 13 is a fragmentary side elevational view of parts being shown in FIG. 12, portions being shown in section;

FIG. 16, on sheet 3, is a fragmentary perspective view of a modified form of cassette and its associated lifter;

FIG. 20A is a fragmentary longitudinal sectional view of another modified form of cassette and showing diagrammatically the movement of lifter mechanism therefor;

FIG. 21 is a fragmentary view similar to FIG. 2 showing the lower end of the magazine and parts associated therewith for unloading and marking film;

FIG. 22 is an enlarged, diagrammatical view of a portion of the marking mechanism of FIG. 21;

FIG. 23 is a fragmentary view similar to FIG. 2 but with the magazine rotated 90° from the position shown therein and parts associated therewith for reloading cassettes with fresh film;

FIG. 24 is an enlarged perpective view of a package of film for use with the unloader-reloader.

FIG. 25 is a fragmentary, enlarged end elevational view of mechanism shown in FIG. 23 for advancing a sheet of fresh film;

FIG. 26 is a side elevational view, on a reduced scale, of the mechanism shown in FIG. 25;

FIG. 27, on sheet 5, is an end elevational view of mechanism shown in FIG. 29 for closing, locking, and ejecting cassettes from the magazine;

FIG. 28, on sheet 5, is a sectional view on the line 28—28 of FIG. 27; and

FIG. 29, on sheet 7, is a fragmentary sectional view like FIG. 2 and with the magazine turned to the position shown in FIG. 23, showing mechanism for releasing, closing and ejecting reloaded cassettes.

DESCRIPTION OF THE PREFERRED EMBODIMENT

Figure 1:
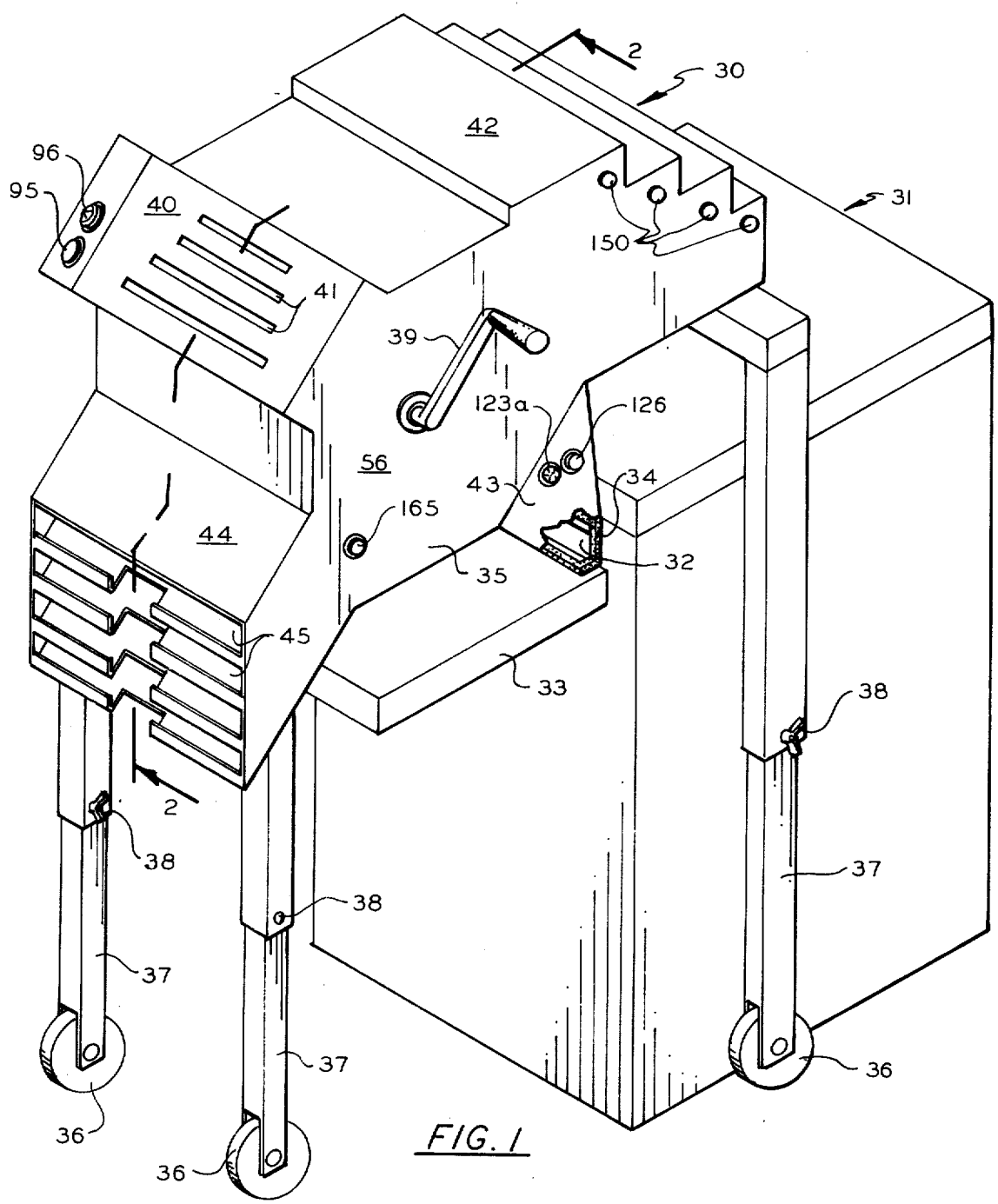
FIG. 1 is a perspective view of an unloader-reloader according to the invention operatively engaged with a conventional film processor.

Referring to FIG. 1, a cassette unloader-reloader is adapted to be positioned adjacent a known radiographic film processor 31, as shown, for transferring the film to the processor loading slot 32 at the end of its receiving tray 33. This transfer is protected in lighttight manner by a gasket fragmentarily shown at 34.

The unloader-reloader has a light-tight cabinet 35 which is preferably mounted on wheels or castors 36 at the end of legs 37 which are made adustable in height by means indicated at 38. Cabinet 35 is provided with a crank at 39, a cassette inserting station at 40, characterized by a plurality of light-tight doors 41, a reloading station at 42, an unloading station at 43, and a reloaded cassette ejection station at 44, characterized by a plurality of cassette-receiving trays 45.

Figure 2:
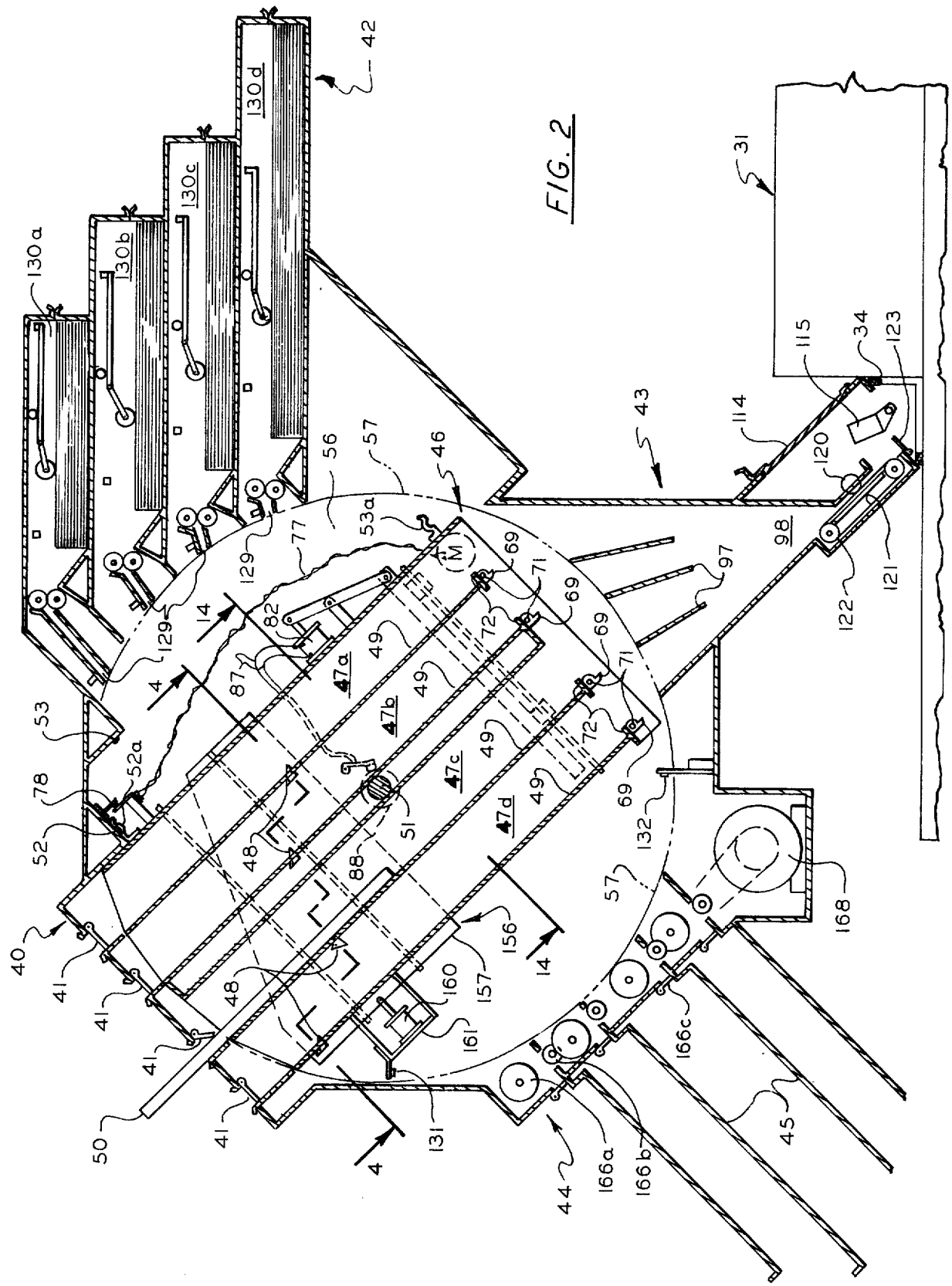
FIG. 2 is a sectional view on the line 2—2 of FIG. 1.

Referring now to FIG. 2, a compartmented magazine, indicated generally at 46, has four cassette-holding compartments 47a, 47b, 47c and 47d, which may also be viewed in transverse cross section in FIG. 4. Each compartment is for a different sized cassette, 8 × 10 inches, 10 × 12 inches, 11 × 14 inches and 14 × 17 inches, for example, the smaller size at the top and the successively larger sizes below. Each compartment 47 has a biased latch 48, also shown in FIG. 5, projecting up, biased by a spring 48a, through a suitable slot in the floor 49 of the compartment, the latch being depressed by a cassette 50 inserted through door 41 as shown in the compartment 47c of FIG. 2.

The magazine 46 is mounted on and secured to a shaft 51 and is rotatable approximately 90° by operation of the crank 39 secured on the shaft, from a position shown in FIG. 2 to that shown in FIGS. 23 and 29. In each position the compartments are inclined about 45° from the vertical. A stop is provided at 52 to limit the clockwise rotation of the magazine and another stop at 53 limits its counter clockwise rotation. Spring detent latches at 52a and 53a are provided to cooperate with stops 52 and 53 to maintain the position of the magazine when the stops are engaged.

Each compartment is open at its upper end in FIG. 2 and each has its own sidewall 54 at each side.

The magazine is light-proof by reason of its containment in cabinet 35 and the magazine has end-walls 55 which rotate adjacent the sidewalls 56 of cabinet 35. Clearance between the magazine and the structures at each station 40, 42, 43 and 44 is indicated by the broken line 57.

Figure 3:
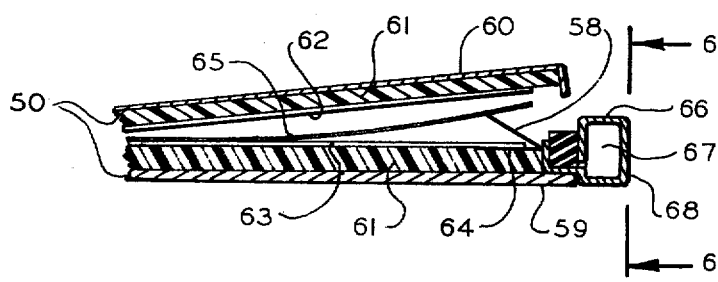
FIG. 3, on sheet 1, is a fragementary sectional view of a conventional open cassette modified for use with the unloader-reloader of FIG. 1.

Referring now to FIG. 3 in which a cassette 50 is shown fragmentarily, all cassettes for use with the loader-unloader 30 are modified by the addition of a simple spring flap 58. It will be understood that the cassette 50 is hinged at the left of FIG. 3 and provided with some sort of a lock at the right or opening side. The cassette comprises a forward portion 59 used nearest the X-ray machine and behind the patient, hereinafter called the base, and a rearward portion 60, hereinafter called the lid. To the inner surface of base 59 and lid 60, a pad layer 61 of felt or other compressible material is secured, as by adhesive, and to the inner surface of the layer 61 of the base a screen 62 is provided, and to the inner surface of layer 61 of the lid a screen 63 is secured, the screens being caused to glow by X-rays.

The flap 58 is formed by permanently bending a strip of springy resinous plastic material along a longitudinally extending midline so that the strip is V-shaped in cross section, as shown in FIG. 3. One leg 64 of the V-shaped strip is secured between the screen and felt layers of the base 59, as shown. When the film 65, of the proper size for the cassette, is inserted one end is held elevated by the flap 58 until the lid 60 is closed. Conversely, when the lid is raised, the springy flap 58 raises this end again so that it may slide by gravity over the lip 66 of the open side of the cassette when the cassette is tilted hinge-side up.

Referring now to FIG. 6, one type of cassette, commonly known as the wafer type, has a lock 67 with a wedge shape projection slideable and spring biased closed in the rectangular hollow edges 68 of the base 59 under the lip 66. Provision for sliding the lock to the open position, as shown, may be in the form of member 69 with a slanted face matching the slanted face of the lock 67 to slide the lock to the right in FIG. 6 to release the tongue 70, which projects from lid 60 (FIG. 3) from the notch in the lock, as shown.

Since there is a lock 67 at either end of the opening side of the cassette, two members 69 are provided, as shown in FIG. 7, secured on a shaft 71 which extends across the lower end of each compartment 27 as shown in FIG. 2. It will be understood that the members 69 are located on shaft 71 so as to be adapted to each engage a cassette lock 67 when cassette 50 is inserted in a compartment 47, as shown, and slides on the floor 49 of the compartment to a stop 72 provided on the floor 49 adjacent shaft 71 at this partially-open end of the compartment.

Referring now to FIGS. 8, 9 and 10, the shafts 71 are jounalled at each end in a sidewall 55 of the compartmented magazine 46 and at one end each shaft has secured thereon a gear 73 as shown in FIG. 10. Other gears 74 in mesh with gears 74, as shown in FIG. 9, to form a train 75 for rotating the shafts in the same direction. Train 75 is driven by a gear 76 secured on the drive shaft of a reversible motor M secured on sidewall 55 and supplied with power, when the magazine 46 is in the position shown in FIG. 2, through lead wires 77 and contacts at 78, as diagrammatically shown.

The lid 60 of the cassette has a tongue 79 projecting forward and down, and shown released by lock 67 in FIG. 6.

Figure 14:
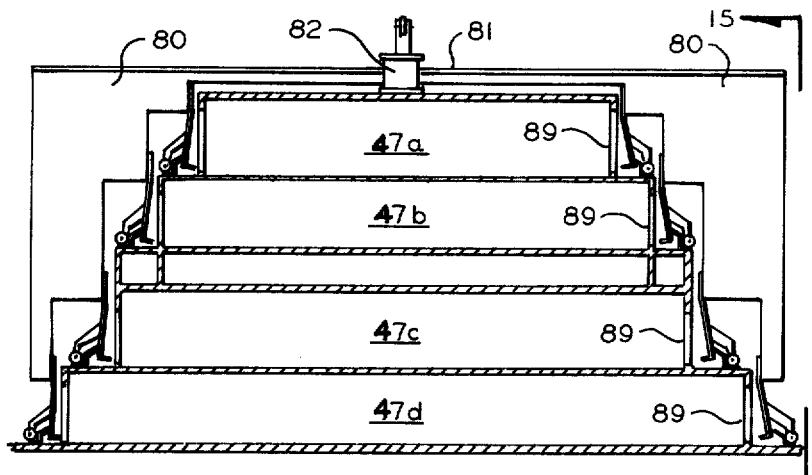
FIG. 14 is a sectional view of the magazine on the line 14—14 of FIG. 2.

Referring now to FIG. 4, there is a space between the sidewalls 54 of each of the compartment sidewalls and the magazine sidewalls 55 which varies in width for each of the comparmtents. As shown in FIG. 14, at the center of this space on each side, in line with the location in which the tongues 69 are adapted to lie, a stepped lifter frame member 80 is provided for lifting the tongue 69 of any cassette in any of the compartments. Members 80 are secured to a lifter crossbar 81 running across above the top compartment 47a and a solenoid 82 is provided secured on the top of compartment 27a for lifting the cross bar 81 and members 80.

Figure 15:
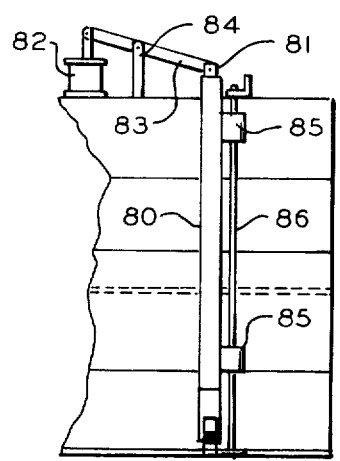
FIG. 15 is a fragmentary side elevational view of parts shown in FIG. 14.

As shown in FIG. 15, a lever is pivotally connected to the solenoid operating plunger at one end and to the cross bar 81 at its other end, a fulcrum 84 being provided at the center. Guides 85 projecting from each memeber 80 coact with a rod 86 at each end secured to the magazine for guiding members 80 in a direction vertical to the planes of the compartment floors. As shown in FIG. 2 electric supply leads 87 connect solenoid 82 to commutator rings 88 carried on shaft 51.

Referring to FIG. 11, a slot 89 is provided in each sidewall 54 of each compartment opposite the location each tongue 79 is adapted to occupy, the sidewall 54 being as viewed from the right in FIG. 14. As shown in FIGS. 12 and 13, adjacent each slot 89, a pendent L shaped lifter 90 of spring steel is secured to the edge of lifter frame 80. The shorter leg of the lifter is adapted to hook under tongue 79 and the flexible longer leg secured to frame 80 carries a bracket 91 on which a roller 92 is mounted as shown. Outside of slot 89 another bracket 93 is secured to the compartment floor extended 49' and bracket 93 has a slanted cam surface 94 in the path of roller 92 as it is lowered as frame 80 is lowered. When the roller meets the cam surface, the lifter is cammed away from contact with tongue 79. Conversely, when the frame 80 is again raised, the roller 92 leaves the cam surface 94 and the shorter leg engages under tongue 79 when lifter 90 springs back to the position shown.

As shown in FIG. 1, a push button switch 95 and an indicator light 96 are provided at station 40 for initiation and reporting of, first, providing current to motor M and then providing current to solenoid 82, which may operate sequentially by reason of means not shown.

When the lid 60 of a cassette 50, in compartment 47c for example as shown in FIG. 21, is lifted by the action of solenoid 82, the flap raises the downward edge of film 65 in the cassette above the lower edge 68 of the cassette. The cassette being inclined at a substantially 45° angle, the film falls or slides downward. Guides 97 at station 43 provide upwardly widening passages for the reception of any sheet of film released from a cassette and funneling it toward a throat shown at 98 in FIG. 21.

It will be noted that there are other types of cassettes beside the wafer type shown fragmentarily in FIG. 6. One of these is the clamp type cassette which has its hinge along one of its shorter sides. The opening side of such cassettes is thus along a short "end" and the comparative measurements of the compartments 47 are therefore different than those shown in FIGS. 2 and 4, the comparatively long measurements appearing in FIG. 4 and the comparatively short measurements being shown in FIG. 2.

Such clamp cassettes have a pair of metal spring clamps extending from long side to long side of the cassette and normally engaged in cam-type holes in the sides and pivotally secured to the cassette lid at its center in spaced relation. The clamps make the lid comparatively heavy so that the clamps may be turned to unlock the cassette by the operator who inserts the cassette in the door 41 at station 40. Alternatively, of course, mechanism may be provided in each compartment for opening the cassettes after insertion.

Ordinarily, clamp cassettes are provided with a ring secured pivotally to hinge brackets, such as shown at 99 in FIG. 16, secured to the lid 60' at the downward or opening end of the cassette. An angle or "Z" shaped bracket 100 is substituted for the ring and secured to the lid by pin 101 and rivet 102, as shown in FIG. 16.

Figure 17:
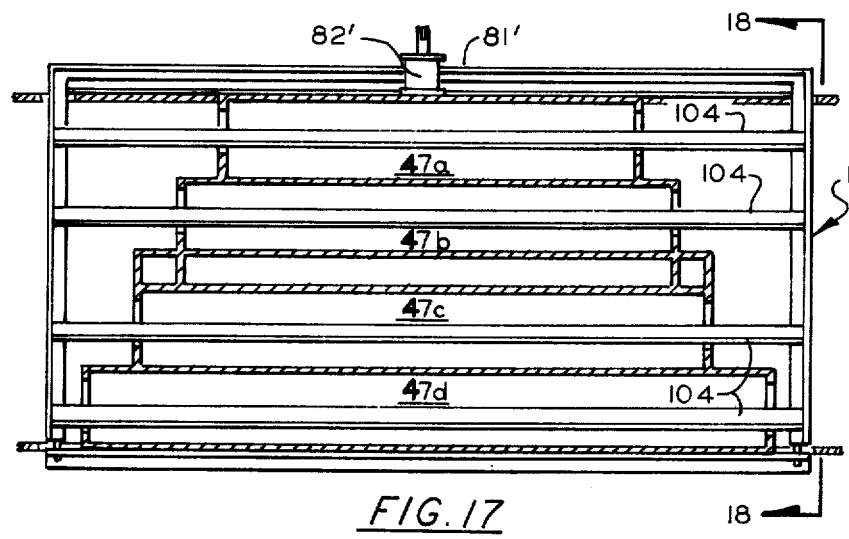
FIG. 17 is a view similar to FIG. 14 showing lifter mechanism for use with cassettes modified as shown in FIG. 16.
Figure 18:
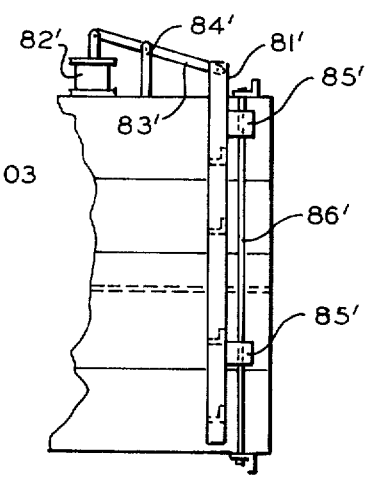
FIG. 18 is a fragmentary side elevational view of parts shown in FIG. 17.

Mechanism, much like the lid lift mechanism shown in FIGS. 14 and 15, is shown in FIGS. 17 and 18 for a loader-unloader designed for clamp cassettes. A solenoid 82' is secured on top of the magazine 46', its operating arm connected by lever 83' to a cross bar 81' and fulcrummed at 84'. A rectanular frame 103 is provided, instead of the lifter frames 80, and lift guides 85' and rods 86' are provided.

Frame 103 has a transversely extending angle 104, one for each compartment, as shown in FIG. 17 and indicated fragmentarily in FIG. 16. Each angle 104 has a leg projecting toward the bracket 100 of the cassette and adapted to engage under the bracket when the cassette comes to rest against stop 72 (FIG. 2). When solenoid 82' is operated the cassette lid is opened and a flap 58 raises the edge of the sheet of film in the cassette, allowing it to drop toward throat 98 at station 43.

Figure 19:
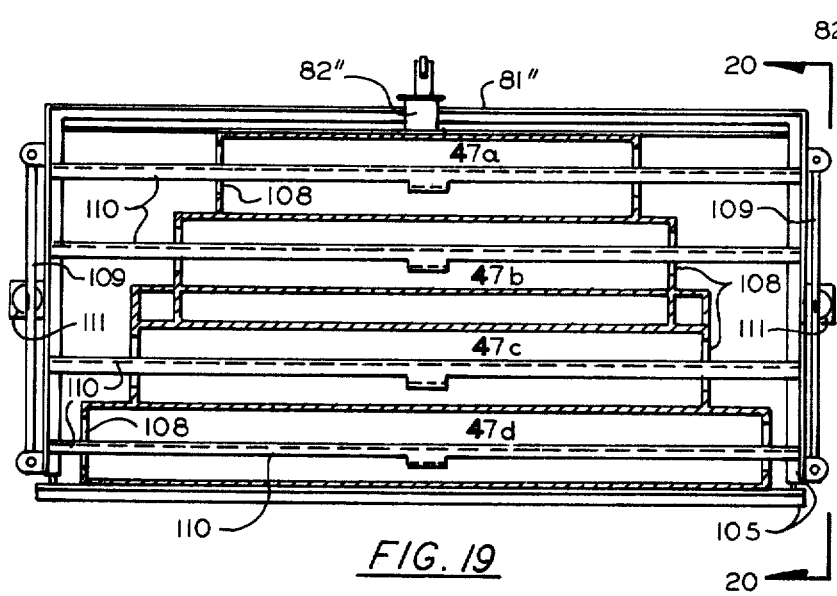
FIG. 19 is a view similar to FIG. 14 showing lifter mechanism for use with cassettes such as shown in FIG. 20A.
Figure 20:
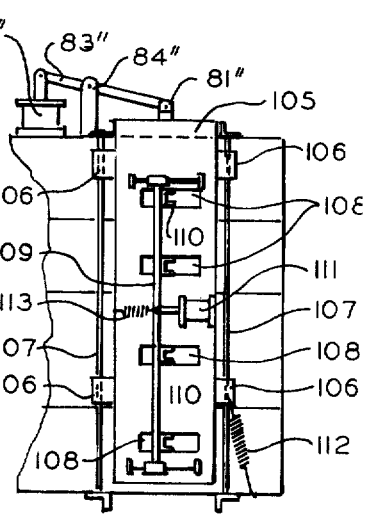
FIG. 20 is a fragmentary side elevational view of parts shown in FIG. 19.

Another type of cassette, called by its maker "Xomatic", has a locking latch Z-shape in cross section, like the bracket 100 shown in FIG. 16, which, when it is lifted, first unlocks the cassette and then may be used to lift the lid. This latch is near the opening, long side of the cassette but has its graspable leg facing toward the hinge side. Mechanism for unlocking this type of cassette and lifting the lid is shown in FIGS. 19 and 20. A solenoid 82" is secured on the top of the magazine and its operating plunger is connected by lever 83", fulcrummed at 84", to a cross arm 81". The cross arm 81" carries a rectangular frame 105 which is guided by guides 106 and rods 107.

The side members of frame 105 are slotted at 108 and a second frame is formed by side members 109 and cross-channels 110 connecting the side members and passing through solts 108. A solenoid 111 on each side member 105 has its operating plunger connected to side member 109 for moving the cross channels 110 to the right in FIG. 20. Operation of solenoid 82", of course, moves the frame 105 and cross channels 110 upward. Springs 112 and 113 on each side, connected as shown, bias the frame 105 downward and the side members 109 to the left in FIG. 20. Solenoids 111 and 82" may be electrically connected to act sequentially and operation may be initiated by the push button 95 at station 4 (FIG. 1).

The cross-channels 110 are adapted to have a flange engage under a leg of the Z-shaped locking latch of the cassette when the solenoids 111 are operated so that the locking latch is first unlocked and then the cassette lid is lifted when solenoid 82" is operated. This operation is diagrammatically shown in FIG. 20A as cross-channel 110 moves down from position A to position B and then engages under the locking latch 112 as the cross-channel moves from position B to position C. When solenoid 82", deriving its power from the commutator rings 88 on shaft 51 (FIG. 2) is actuated the locking latch 112 is lifted, the cassette 50" is unlocked and its lid is lifted to position D and held lifted until the cassette is released from its position as shown in FIG. 23, as will be described.

Referring again to FIG. 21, means may be provided for marking the film 65 ejected from cassette 50 with information such as the patient's name, date and other information. A door 114 is provided at station 43, as shown, and the operator, prior to activating switch 95 at station 40, may insert a card bearing the required information into one side of a box-like carrier 115 pivotally mounted to the cabinet wall at 116. The carrier is provided with a lamp 117 which is powered for an instant by operation of a switch lever 118, to be described.

Referring now to FIG. 22, a film guide 119 with a hold-down roller 120 is positioned, as shown in FIG. 21, at station 43. Continuously moving belts 121, carried on rollers 122, shown in FIG. 21, are positioned below throat 98 at station 43 to receive the exposed film 65 falling from the cassette 50 and carry it until the leading edge of the film rests against the stops 123. Just as the film reaches the stops it actuates the actuating lever 118 of a switch, not shown, for dropping carrier 115 onto the film and illuminating the lamp 117, the lever 118 projecting up through a slot in the guide 119. Operation of this switch also illuminates a signal light 123a, shown in FIG. 1, by means not shown.

The stops 123 are mounted on a shaft 124 which is partially rotated by a solenoid 125 energized when the operator pushes the switch button 126 located at station 43 shown in FIG. 1. The operator thus controls the introduction of the exposed film 65 into the processor 31 until after inspection of the processor shows that it is ready to receive the film.

After the processor 31 recives the film 65 the operator turns the crank 39 counterclockwise, as shown in FIG. 1, one quarter turn to rotate magazine 46 to the position shown in FIG. 23 until the compartments 47a, b, c and d are aligned with the exits 129 of chambers 130a, b, c and d at station 42.

Referring to FIG. 2, latch 52a is disengaged from stop 52 and the electrical contacts at 78 are disengaged. Latch 53a becomes engaged with stop 53, power being maintained in solenoid 82 through commutator rings 88 to keep the cassette lid open. Any cassette in a compartment 47 is held in place by its latch 48. Electrical contacts 131 on the magazine come into contact with othe contacts 132 on the cabinet for a purpose to be described.

Referring now to FIGS. 23 and 24, means are provided at station 43 for feeding a fresh sheet of film 133 into any cassette, still open, in any compartment 47. Each chamber 130a, b, c, d is provided with a door 134 through which a pack 135 of fresh film sheets 133 may be inserted.

A pack 135 is shown in FIG. 24 as having an open-topped rectangular box-type body or bottom 136, one end 137 of the bottom being formed as a hinged flap which may be bent outward as shown, by pressure on the film sheets 133 therein. The box top 138 is slidable on the bottom 136 so that when the pack is inserted in a compartment 130 on the top may be drawn off the bottom while the door 134 is held only slightly ajar by the top, the door being spring biased toward closed for holding the door against the top.

As the best seen in FIGS. 25 and 26, each compartment 130 is provided with a shaft 139 extending thereacross and, secured thereto, a pinion gear 140. Each shaft 139 is provided at one end with a reversible electric motor 141.

Each gear 140 is in mesh with a rack 142 formed or secured on a slide 143 guided in ways 144, shown in FIG. 25, and secured in the compartment 130 spaced above the stack of fresh sheets of film 133 in the box body of pack 135. A pusher arm 145 is pivotally secured at 146 to the slide at one end and has one or more rollers 147 rotatably secured thereto, as shown in FIG. 25. Rollers 147 are biased against rotation by coil spring means, not shown but known in the art, and are provided with a ribbed rubber peripheral surface. Preferably, the spring bias against rotation is adjustably. A lifter pin 148 is provided for each arm 145 for lifting arm 148 at the end of its stroke as shown in FIG. 26.

Motor 141 is wired to first advance the slide 143 past the pin 148 and then return the slide to the position shown in FIG. 26. Referring to FIG. 1, a push button switch 150 is provided for each compartment 130 for operator initiation of the desired motor 141. Referring again to FIG. 23 a limit switch 151 is provided at the forward end of ways 144 for reversing motor 141 and another limit swithc 152 is provided at the return end of the ways for stopping the operation of motor 141 at the end of its stroke as shown in FIG. 26.

Forward of the supply area of each compartment 130, to the left in FIG. 23, a ramp 153 is provided against which the end flap 137 of pack 135 is adapted to rest. At the upper end of each ramp a pair of continuously rotating rollers 154,154 are adapted to receive therebetween, any sheet 133 of fresh film pushed forward by the above described rollers 147 and convey the sheet between the upper and lower walls of exit passage 129 into the open end of cassette 50.

Referring again to FIGS. 4 and 5, each latch 48, biased by its spring 48a, is pivotally secured to an angle crossmember 155 of a frame 156 having side members 157. The crossmembers 155 are below each compartment floor 49, the latch 48 projecting through an appropriate slot 158 in the floor. A solenoid 160 under the floor of the lowermost compartment has its plunger secured to the lowermost crossmember 155 at its center, the solenoid being secured to a pendant extension 161 of the floor 49d, for lowering the frame 156.

As best seen in FIG. 4, a spring 162 on each side of the magazine 46 has one end connected to the roof 163 of the uppermost compartment and its other end connected to a member 164 secured to the member 157 and extending down along side member 157 for biasing the frame 156 upward. The extension 161 carries the electrical contact 131 adapted to make contact with the contact 132 carried on the cabinet at station 44 for carrying electrical current for energizing solenoid 160 when the magazine 46 is in the position shown in FIG. 24.

Referring to FIG. 1, a push button switch 165 is provided at station 44 for energizng solenoid 160. Switch means, not shown and preferably operable by switch 165, is provided for cutting off current to the solenoid 82, 82' or 82'' and thus restoring the lid lift mechanism to its position at the start of the cycle. The operator, on hearing, or otherwise being notified of the transfer of a fresh sheet 133 of film into a cassette 50 in the magazine can thus initiate the release of the cassette.

Referring to FIG. 29, rollers 166a and 166b are provided at station 44 for each compartment for closing the cassette. As shown in FIGS. 27 and 28, the rollers 166a and 166b are carried on shafts 167 extending across between the sides 56 of the cabinet and the rollers are spaced apart in pairs a distance equal to the thickness of a cassette for squeezing the cassette closed when a cassette passes therebetween and out through the aligned spring-biased exit doors 166c.

A motor 168, as shown n FIG. 27, is provided for driving one of the rods 167 of one roller of each pair by means of an appropriate belt and pulleys and the rods are connected for synchronous rotation by chains 169 on suitable sprockets. When the cassette in any compartment 47 falls by reason of the lowering of latches 48 the lid is closed by passing between the rotating rollers 166a and 166b. The wafer type and "Xomatic" cassettes snap shut and locked when the cassette lid is pressed against its base and the cassette falls into an appropriate tray 45 (FIG. 1). In the case of the clamp-type cassettes, the operator may manually catch the ejected cassette and close the clamps or, when unlocking mechanism is provided within magazine 46, the same mechanism may be reversed to operate the clamps while being ejected The operation of the unloader-reloader 30 commences with the magazine in the position shown in FIGS. 2 and 21 ready for insertion of the cassette. The operator first inserts a card with the desired marking information thereon in the carrier 115, if this marking is desired. Next the cassette is inserted through the proper door 41 and it slides to the lower end of the selected compartment 47 opening side downward. The switch 95 at station 40 is closed and the cassette is opened and its lid is lifted by the means described above.

With the raising of the lid, the flap 58 springs open raising the lower edge of the exposed film sheet 65 and the sheet slides by gravity through the throat 98 at station 43 as illustrated in FIG. 21. Passing through the throat the sheet is guided by the belts 121 until the sheet comes to rest with its leading edge against the stops 123. As it passes the switch lever 118, the lamp 117 is operated momentarily and the film is marked and signal light 123a is lit to alert the operator.

When the processor 31 is clear to receive sheet 65, the switch 126 is operated and stops 124 are turned to disengagement with the film by solenoid 125 as described in connection with FIG. 22. The film, being released, slides by gravity through the slot 32 of the processor which proceeds to develop the film.

After the appropriate interval, the operator turns the crank 39 a quarter turn counterclockwise, rotating the magazine 46 to the position shown in FIGS. 23 and 29. A selected switch 150 at station 42 is then operated and the means for advancing the top sheet 133 of fresh film in the chosen chamber 130 operates as described in connection with FIG. 23. As the sheet 133 advances it is conveyed by the rollers 154 through the exit passage 129 and into the still-open side of cassette 50. As the film sheet 133 leaves rollers 154 it slides by gravity into the base 59 of the cassette.

The operator, on hearing the ceasing of operation of motor 141 (FIG. 25), pushes switch button 165 at station 44 and latches 48 are lowered by the release means described in connection with FIG. 4 by operation of solenoid 160. Any cassette in magazine 46 then slides by gravity to the lower end of its compartment 47 where it is engaged by the pair of rollers 166a and 166b at the lower end of the compartment. The now-reloaded cassette 50 is conveyed by the rollers into a tray 45, the rollers closing the cassette as it passes therebetween. The cassette is snap-locked by the rollers 166a and 166b or, in case of the clamp of the clamp cassette, the clamps may be locked by the operator.

While the above described operation is in part manual, it will be apparent that the unloader-reloader 30 is adapted for operation by automatic sequential means similar to that described in U.S. Pat. No. 3,675,014 issued July 4, 1972 to the same inventor.

I claim:

1. A light-proofed radiographic cassette unloader-reloader adapted for use with an automatic film processor and for use with a hinged cassette having a narrow flap along its opening side adapted to raise a film edge above the cassette base edge when the cassette lid is raised, comprising: a light-proofed cabinet, a magazine rotatably mounted within the cabinet and having at least one compartment means therein adapted to slidingly receive a cassette, the compartment means being open at one end and provided with cassette arresting stop means at the other end, means for turning the magazine from a first position in which the compartment floor is inclined at substantially 45° in one direction from vertical to a second position in which the floor is inclined at substantially 45° in the opposite direction from vertical, the cabinet having a cassette insertion station in which insertion door means register with the open end of the compartment means when the magazine is in its first position, the cabinet having an unloading station in which film-guide passage means register with the stop means end of the compartment means when the magazine is in its first position and means for passing unloaded film to the processor, the magazine having motor-operated means for unlocking cassettes therein and lifting cassette lids when the magazine is in its first position, the cabinet having a reloading station in which at least one chamber is adapted to contain a stack of film sheets of a size to fit the cassettes and downwardly inclined film supply passage means adapted to register with the stop means end of the compartment means when the magazine is in its second position, the compartment means having releasable latch means for holding the cassette therein adjacent the stop means end of the compartment means and the lid lifting means being adapted to maintain the cassette open when the magazine is turned from its first to its second position, means in the chamber for advancing and expelling a single sheet of film on demand through the film supply passage, the cabinet having a cassette ejection station in which cassette closing means and ejection door means register with the open end of the compartment means when the magazine is in its second position, and means in the magazine for releasing the releasable latch means, the releasing means being controlled at the ejection station; whereby a cassette falls to the stop means end of the compartment means when inserted, the exposed film falls and is carried to the processor when the cassette is opened, a fresh sheet of unexposed film falls into the open cassette after the magazine is turned to its second position, and the cassette is ejected when the latch means is operated.

2. A light-proofed radiographic cassette unloader-reloader adapted for use with an automatic film processor and for use with a hinged cassette having a narrow flap along its opening side adapted to raise a film edge above the cassette base edge when the cassete lid is raised, comprising: a light-proofed cabinet, a magzine rotatably mounted within the cabinet and having at least one compartment therein adapted to receive a cassette, means mounted on the cabinet for turning the magazine from a first position in which the compartment floor is inclined at a substantial angle in one direction from the vertical to a second position in which the compartment floor is inclined a substantial angle in the opposite direction from the vertical, the cabinet having a cassette insertion station in which an insertion door is in register with the upper open end of the compartment when the magazine is in its first position, the cabinet having a film unloading station in which a passage for guiding film downward is in register with the lower partially open end of the compartment when the magazine is in its first position, the compartment having stop means for keeping the cassette therein from dropping out of its partially open end, the magazine having motor-operated means for unlocking a cassette therein and lifting its lid to release the film therein when the magazine is in its first position, the motor means being initiatable by control means at the cassette insertion station, endless belt conveyor means in the cabinet at the end of the film guide passage for carrying film from the passage to a film exit from the unloader-reloader, movable stop means at the end of the conveyor to normally engage the leading edge of a film carried on the conveyor, the film exit being adapted for light-proofed engagement with the film-receiving entrance of the processor, means for moving the movable stop means to free the passage of the film when the processor is in condition to accept the film, the cabinet having a film reloading station in which at least one chamber is adapted to contain a stock of film sheets of a size to fit the cassette in the compartment, the chamber having a downwardly inclined exit passage adapted to register with the compartment partially open upper end when the magazine is in its second position, the compartment having spring biased latch means for holding the cassete therein adjacent the partially open end and the lid lifting means being adapted to maintain the cassette open when the magazine is turned from its first to its second position, means in each chamber for advancing and expelling a single sheet of film through its exit passage, the cabinet having a cassette ejection station in which a pair of spaced rollers is in register with the lower open end of the compartment when the magazine is in its second position for receiving therebetween a cassette released from the compartment squeezing the cassette therebetween to close and lock the cassette, the cabinet having an exit door aligned with each pair of rollers to allow the ejection of the cassette therethrough by the rollers, the insertion and ejection doors being light-proofed and normally spring-biased closed, and means in the magazine for releasing the latch means in the compartment, the releasing means being initiatable at the cassette ejection station; whereby a cassette falls to the partially open end of the compartment when inserted, the exposed film falls and is carried to the movable stop means when the cassette is opened, a fresh sheet of unexposed film falls into the open cassette when it is selectively released from its chamber, and the cassette is ejected from the cabinet by the rollers when the latch means is released at the ejection station.

3. A light-proofed radiographic cassette unloader-reloader adapted for use with an automatic film processor and for use with a hinged cassette havig a narrow flap along its opening side adapted to raise a film edge above the cassette base edge when the cassette lid is raised, comprising: a light-proofed cabinet, a magazine rotatably mounted within the cabinet, the magazine having a plurality of compartments therein adapted to receive cassettes of a different size in each compartment, means mounted on the cabinet for turning the magazine from a first position in which the compartment floors are inclined substantially 45° in one direction from the vertical to a second position in which the compartment floors are inclined substantially 45° in the opposite direction from the vertical, the cabinet having a cassette insertion station in which an insertion door is in register with the upper open end of each compartment when the magazine is in its first position, the cabinet having a film unloading station in which a passage for guiding film downward is in reister with the lower partially-open end of each compartment when the magazine is in its first position, each compartment having stop means for keeping the cassette therein from dropping out of its partially open end, the magazine having motor-operated means for unlocking a cassette in any compartment and lifting its lid to release the film therein when the magazine is in its first position, the motor means being initiatable by control means at the cassette insertion station, endles belt conveyor means in the cabinet at the converging ends of the film guide passages for carrying film from the passages to a film exit from the unloader-reloader, movable stop means at the end of the conveyor to normally engage the leading edge of a film carried on the convryor, the film exit being adapted for light-proofed engagement with the film-receiving entrance of the processor, means for moving the movable stop means to free the passage of the film when the processor is in condition to accept the film, the cabinet having a film reloading station in which a plurality of chambers are adapted to contain a stack of film sheets, the chambers having respective downwardly inclined exit passages adapted to register with the compartments partially open upper ends when the magazine is in its second position, each compartment having spring biased latch means for holding a cassette therein adjacent the partially open end and the lid lifting means being adapted to maintain the cassette open when the magazine is turned from its first to its second position, each chamber having film sheets therein of a size to fit a cassette in the compartment with which its exit passage is in register, means in each chamber for advancing and expelling a single sheet of film through its exit passage, the cabinet having a cassette ejection station in which a pair of spaced rollers is in register with the lower open end of each compartment when the magazine is in its second position for receiving therebetween a cassette released from the compartment and squeezing the cassette therebetween to close and lock the cassette, the cabinet having an exit door aligned with each pair of rollers to allow the ejection of a cassette therethrough by the rollers, the insertion and exit doors being light-proofed and normally spring-biased closed, and means in the magazine for releasing all the latches in the compartments, the releasing means being initiatable at the cassette ejection station; whereby a cassette falls to the partially open end of its compartment when inserted, the exposed film falls and is carried to the movable stop means when a cassette is opened in a compartment, a fresh sheet of unexposed film falls into the open cassette when it is selectively released from its chamber, and the cassette is ejected from the cabinet by the rollers when the latches are released at the ejection station.

4. The unloader-reloader defined in claim 3 wherein means for marking unloaded film is provided at the film unloading station, comprising: a carrier box pivotably secured in the cabinet adjacent the movable stop means at the end of the conveyor, the box being adapted to slidingly receive cards having the data desired to be marked inscribed thereon, an access door in the cabinet for access to the box for loading the cards in the box, switch means adjacent the movable stop means having an operating arm in the path of unloaded film on the conveyor prior to reaching the movable stop means, a lamp in the carrier box adapted when lit to photosensitize the film, means for maintaining the box normally out of contact with film on the conveyor and release means for the maintaining means operable by the leading edge of film on the conveyor meeting the switch arm for briefly dropping the box on the leading edge of the film and illuminating the lamp, whereby the film, when processed, bears the data inscribed on the card.

* * * * *